I. ARTHUR.
Splicing-Bar for Vehicle-Axles.

No. 196,620. Patented Oct. 30, 1877.

Witnesses:
Louis Bagger
Wm Bagger

Inventor:
Isaiah Arthur.
By Parker H. Sweet Jr. & Co.
his Atty's.

UNITED STATES PATENT OFFICE.

ISAIAH ARTHUR, OF MECHANICSBURG, PENNSYLVANIA.

IMPROVEMENT IN SPLICING-BARS FOR VEHICLE-AXLES.

Specification forming part of Letters Patent No. 196,620, dated October 30, 1877; application filed September 13, 1877.

*To all whom it may concern:*

Be it known that I, ISAIAH ARTHUR, of Mechanicsburg, in the county of Cumberland and State of Pennsylvania, have invented certain new and useful Improvements in Splicing-Bar for Axles; and I do hereby declare that the following is a full, clear, and exact description thereof, which will enable others skilled in the art to which it appertains to make and use the same, reference being had to the accompanying drawings, and to letters of reference marked thereon, which form a part of this specification, and in which—

Figure 1:
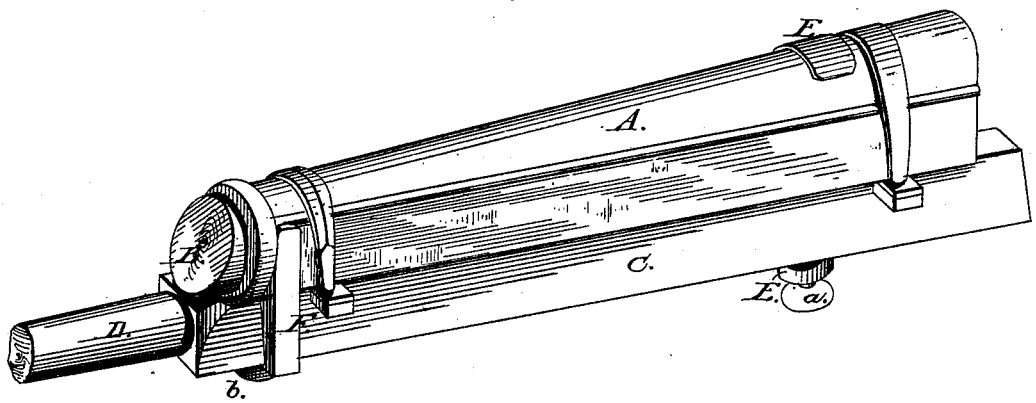
Figure 2:
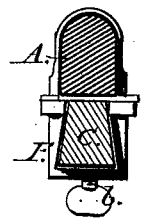
Figure 3:
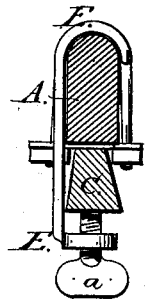

Figure 1 is a perspective view of my invention. Figs. 2 and 3 are sectional views of the same.

Similar letters of reference occurring on the several figures indicate like parts.

My invention has for its object to provide a ready and efficient means for splicing the broken axle of a vehicle, so as to allow of the adjustment of the wheel thereon, and the consequent easy transportation of the disabled vehicle to any desired place for the necessary repairs; and it consists in the details of construction and general arrangement of parts, all as will be hereinafter more fully described, and pointed out in the claims.

Referring to the drawings, A represents an axle of the ordinary construction, having its spindle B broken away, as shown. C represents the splicing-bar, provided with a spindle, D, and adapted to be adjusted to the under side of the axle A, to which it is secured by means of the clamp E, which fits over the two parts, and is adjusted in place by the thumb-screw *a*. The splicing-bar C is made much smaller on its upper surface than at the bottom, thus enabling the bar to be neatly fitted in between the nuts on each side of the axle-clip, as shown in Figs. 2 and 3 of the drawings, thereby obviating all danger of the lateral displacement of the bar. F represents a sliding clamp capable of adjustment at different points upon the bar C, by means of the thumb-screw *b*, the upper part of said clamp lapping over and embracing the sides of the axle A, thereby serving to hold the two parts more firmly together. A suitable groove may be constructed in the lower surface of the bar C, for holding the clamping-screws *a* and *b* securely in place.

The construction of my invention being as already described, it will be observed that in case of the axle-spindle of a vehicle being accidentally broken while on the road, the splicing-bar can be readily and securely adjusted in place upon the broken axle, and the wheel placed upon the spindle of the bar, thereby enabling the vehicle, with its load, to resume its journey to the desired destination.

The advantages of my invention will be readily apparent from the foregoing description, inasmuch as it combines in its construction and operation a high degree of simplicity and economy with a ready adaptation for the purpose intended.

Having thus described my invention, what I claim as new and useful is—

1. The hereinbefore-described splicing-bar C, having the spindle D, and provided with clamps E and F, in combination with the axle A, substantially as and for the purpose described.

2. The splice-bar C, constructed as described, and provided with the clamps E and F, having thumb-screws *a* and *b*, substantially as and for the purpose specified.

3. The splice-bar C, having its upper face adapted to fit between the nuts of the axle-clips, substantially as and for the purpose specified.

In testimony that I claim the foregoing as my own invention I affix my signature in presence of two witnesses.

ISAIAH ARTHUR.

Witnesses:
PARKER H. SWEET, Jr.,
W. U. HEATON.